(12) United States Patent
Zhang et al.

(10) Patent No.: US 9,177,188 B2
(45) Date of Patent: Nov. 3, 2015

(54) METHOD AND SYSTEM FOR DETECTING DETECTION PATTERNS OF QR CODE

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP CO., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/102,799

(22) Filed: Dec. 11, 2013

(65) Prior Publication Data
US 2015/0090795 A1    Apr. 2, 2015

(30) Foreign Application Priority Data

Sep. 29, 2013   (CN) .......................... 2013 1 0455052

(51) Int. Cl.
*G06K 7/10*   (2006.01)
*G06K 7/14*   (2006.01)

(52) U.S. Cl.
CPC ............ *G06K 7/1417* (2013.01); *G06K 7/1456* (2013.01)

(58) Field of Classification Search
CPC . G06K 7/1417; G06K 7/1456; G06K 7/1443; G06K 19/06131; G06K 2019/06262
USPC .............................. 235/462.01, 462.08, 462.09
See application file for complete search history.

(56) References Cited

U.S. PATENT DOCUMENTS

| | | | |
|---|---|---|---|
| 2001/0023896 A1* | 9/2001 | He et al. ......................... | 235/494 |
| 2004/0020989 A1* | 2/2004 | Muramatsu ................ | 235/462.1 |
| 2006/0082475 A1* | 4/2006 | Zhao et al. ....................... | 341/50 |
| 2007/0228171 A1* | 10/2007 | Thiyagarajah ............ | 235/462.09 |
| 2007/0295814 A1* | 12/2007 | Tanaka et al. .................. | 235/454 |
| 2009/0078766 A1* | 3/2009 | Furuyama et al. ............. | 235/454 |
| 2009/0078772 A1* | 3/2009 | Ofek et al. ................ | 235/462.04 |

(Continued)

OTHER PUBLICATIONS

"Information technology—Automatic identification and data capture techniques—QR Code 2005 bar code symbology specification," ISO/IEC 2004, dated Aug. 1, 2005.*

(Continued)

*Primary Examiner* — Thien M Le
*Assistant Examiner* — Claude J Brown
(74) *Attorney, Agent, or Firm* — Brinks Gilson & Lione

(57) ABSTRACT

Method and system for detecting detection patterns of a QR code is disclosed, detection is performed in a first direction and then in a second direction based on the first direction detection to detect a line segment having a length ratio of black:white:black:white:black meeting a predetermined ratio to determine the central points of the detection patterns, and thereby find out all detection patterns. Line-by-line traversal detection in a first direction is used to detect the detection patterns. Detection is performed based on the detected central point of the first line segment. Thus, detection steps may be greatly saved to simplify the detection procedure and improve computing speed. Fast detection of detection patterns may be realized for a QR code image.

19 Claims, 6 Drawing Sheets

```
detect the QR code along a first direction to
  detect a first line segment having a length
ratio of black:white:black:white:black meeting
   a predetermined ratio, and determine the
     central point of the first line segment
```

↓

```
detect along a second direction a line running
  through the central point of the first line
 segment to get a second line segment having a
   black:white:black:white:black ratio meeting
  the predetermined ratio, and take the central
      point of the second line segment as the
        central point of the detection pattern
```

(56) References Cited

U.S. PATENT DOCUMENTS

2010/0155464 A1* 6/2010 Swayn et al. ............... 235/375
2012/0292394 A1* 11/2012 Kakino ................. 235/462.11
2014/0061316 A1* 3/2014 Narayanaswami et al. ... 235/492
2014/0097246 A1* 4/2014 Hu et al. .................... 235/437
2014/0158753 A1* 6/2014 Sisselman ................. 235/375
2014/0231523 A1* 8/2014 Polianko et al. ......... 235/462.09

OTHER PUBLICATIONS

Chen et al., "A Simple and Efficient Image Pre-processing for QR Decoder," 2nd Int'l. Conference on Electronic & Mechanical Engineering and Information Technology (EMEIT—2012).*

* cited by examiner

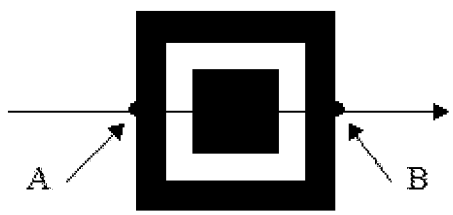

Fig. 1

```
detect the QR code along a first direction to
  detect a first line segment having a length
ratio of black:white:black:white:black meeting
    a predetermined ratio, and determine the
    central point of the first line segment
```
                    │
                    ▼
```
detect along a second direction a line running
  through the central point of the first line
segment to get a second line segment having a
  black:white:black:white:black ratio meeting
the predetermined ratio, and take the central
    point of the second line segment as the
    central point of the detection pattern
```

Fig. 2

METHOD AND SYSTEM FOR DETECTING DETECTION PATTERNS OF QR CODE

CROSS-REFERENCE TO RELATED APPLICATIONS

This application claims priority to Chinese Patent Application No. 201310455052.3, filed on Sep. 29, 2013 and entitled "METHOD AND SYSTEM FOR DETECTING DETECTION PATTERNS OF QR CODE", which is incorporated herein by reference in its entirety.

FIELD OF THE INVENTION

The present invention relates to the field of image locating techniques, and more particular, to a method and system for detecting detection patterns of a QR code.

DESCRIPTION OF THE RELATED ART

Recently, with the development of automatic information collection technology, QR codes have gained wider and wider applications. The QR code is a kind of two dimensional (2D) barcodes, which has advantages of faster reading speed, larger data intensity, and smaller footprints over other 2D codes. QR codes are generally in square shapes and in black and white only. For QR codes, decoding software may locate a QR code image with the help of finder patterns.

The finder patterns comprise three identical detection patterns on the upper left, upper right, and lower left corners of the QR code respectively. Each detection pattern may be considered as being composed of three superimposed concentric squares with 7×7 dark modules, 5×5 light modules, and 3×3 dark modules respectively. Thus, a black-and-white length ratio of 1:1:3:1:1 may be satisfied on a line segment passing through the central block of a detection pattern. The probability of an encounter with such a similar pattern at other locations in a QR code is very low. Thereby, a penitential QR code may be rapidly identified by means of detection patterns. A two dimensional code reader may be used to detect the position, size, inclination of a QR code, and then the QR code may be decoded to realize fast omnidirectional reading and recognition of the QR code.

The detection of detection patterns in the prior art depends on the characteristic of meeting a black-and-white length ratio of 1:1:3:1:1 on a line segment within a detection pattern, and particularly is realized through edge detection. When a preselected area is detected, a line segment between a first point A and a last point B where a line of pixels within a QR code image crosses with edges of a detection pattern should meet a black-and-white length ratio of 1:1:3:1:1, as shown in FIG. 1. The detection is performed on adjacent line of pixels in the image repeatedly until all line segments meeting a black-and-white length ratio of 1:1:3:1:1 in the horizontal direction passing through the central block of the detection pattern are identified. In the vertical direction, all line segments meeting a black-and-white length ratio of 1:1:3:1:1 passing through the central block of the detection pattern are identified. A middle line connected between pixels A and B passing through the central block of the detection pattern in the horizontal direction is determined; in the vertical direction, a corresponding line is also determined in the same way; the crossing point of the two lines is the central point of the detection pattern. Central points of other two detection patterns may be determined according to the same method. Thus, the three detection patterns and central points thereof may be detected.

Detecting detection patterns through edge detection needs a large amount of computation space, especially in situations of limited computing speeds, which may take a long time to detect the detection patterns, resulting low detection efficiency, and thus poor detection experience of users. With the progress of technology, it is unable to satisfy requirements advanced by users for the speed of QR code identification.

SUMMARY OF THE INVENTION

Thus, a method and system for detecting detection patterns is provided in this invention to solve the problem in the prior art of unable to detect detection patterns of a QR code.

In order to solve the above problems, this invention is implemented in the following technical solutions.

A method for detecting detection patterns of a QR code, comprising:

detecting the QR code along a first direction to detect a first line segment having a length ratio of black:white:black:white:black meeting a predetermined ratio, and determining the central point of the first line segment;

detecting along a second direction a straight line running through the central point of the first line segment to get a second line segment having a length ratio of black:white:black:white:black meeting the predetermined ratio, and using the central point of the second line segment as the central point of the detection pattern.

Further, the method comprises the following step:

detecting on a straight line running through the central point of the second line segment along the first direction, if a line segment having a length ratio of black:white:black:white:black meeting the predetermined ratio is detected, taking the central point of the second line segment as the central point of the detection pattern; otherwise, returning to the step of detecting the QR code along the first direction.

Further, the method comprises the following step:

along a +45 degree or −45 degree diagonal direction with respect to the first direction, detecting on a straight line running through the central point of the second line segment; if a line segment having a length ratio of black:white:black:white:black meeting the predetermined ratio is detected, taking the central point of the second line segment as the central point of the detection pattern; otherwise, returning to the step of detecting the QR code along the first direction.

Further, the predetermined ratio is such configured that the ratio of the length of each black section to the total length of the black and white sections and the ratio of the length of each white section to the total length of the black and white sections are both within a range from 0.5:7 to 2:7.

Further, the method comprises the following step:

setting a detection step size for detecting the QR code along the first direction, wherein the detection step size is less than or equal to the number of pixels contained in one module of the QR code in the first direction.

Further, in the step of setting a detection step size for detecting the QR code along the first direction, the detection step size is obtained according to the number of pixels contained in the QR code in the first direction and the number of pixels contained in the one module in the first direction.

Further, in the step of setting a detection step size for detecting the QR code along the first direction, the detection step size is obtained through the following equation:

$$L = Max(M \times N / Mod, Min)$$

wherein, M is the number of pixels contained in the QR code in the first direction, N is an adjustment coefficient and 0<N≤1, Mod is a predetermined number of modules contained in the QR code in the first direction, Min is the number of pixels contained in one module of the QR code in the first direction.

Further, in the step of setting a detection step size for detecting the QR code along the first direction, the predetermined number of modules contained in the QR code in the first direction is Mod=57.

Further, in the step of setting a detection step size for detecting the QR code along the first direction, the adjustment coefficient N is set to 0.75.

A system for detecting detection patterns of a QR code, characterized in comprising:

a first direction detection module, for detecting the QR code along a first direction to detect a first line segment having a length ratio of black:white:black:white:black meeting a predetermined ratio, and determining the central point of the first line segment;

a second direction detection module, for detecting along a second direction a straight line running through the central point of the first line segment to get a second line segment having a length ratio of black:white:black:white:black meeting the predetermined ratio, and using the central point of the second line segment as the central point of the detection pattern.

Further, the system comprises:

a comparison and determination module, for detecting on a straight line running through the central point of the second line segment along the first direction, if a line segment having a length ratio of black:white:black:white:black meeting the predetermined ratio is detected, taking the central point of the second line segment as the central point of the detection pattern; otherwise, returning to the first direction detecting module.

Further, the system comprises:

a diagonal direction detection module, for along a +45 degree or −45 degree diagonal direction with respect to the first direction, detecting on a straight line running through the central point of the second line segment; if a line segment having a length ratio of black:white:black:white:black meeting the predetermined ratio is detected, taking the central point of the second line segment as the central point of the detection pattern; otherwise, returning to the first direction detection module.

Further, the predetermined ratio is such configured that the ratio of the length of each black section to the total length of the black and white sections and the ratio of the length of each white section to the total length of the black and white sections are both within a range from 0.5:7 to 2:7

Further, the system comprises:

a detection step size setting module, for setting a detection step size for detecting the QR code along the first direction, wherein the detection step size is less than or equal to the number of pixels contained in one module of the QR code in the first direction.

Further, the detection step size setting module is configured to obtained the detection step size according to the number of pixels contained in the QR code in the first direction and the number of pixels contained in the one module in the first direction.

Further, the detection step size setting module obtains the detection step size through the following equation:

$$L=Max(M \times N/Mod, Min)$$

wherein, M is the number of pixels contained in the QR code in the first direction, N is an adjustment coefficient and 0<N≤1, Mod is a predetermined number of modules contained in the QR code in the first direction, Min is the number of pixels contained in one module of the QR code in the first direction.

Further, the detection step size setting module sets the predetermined number of modules contained in the QR code in the first direction to Mod=57.

Further, the detection step size setting module sets the adjustment coefficient N to 0.75.

The above technical solutions of this invention have the following advantages over the prior art:

(1) In the method and system for detecting detection patterns of a QR code of this invention, detection is performed, at first, in a first direction and then in a second direction based on the detection in the first direction, to detect a line segment having a length ratio of black:white:black:white:black meeting a predetermined ratio to determine the central points of the detection patterns, and thereby find out all detection patterns. There is no need to perform line-by-line traversal detection in the entire QR code image in the vertical direction and the horizontal direction respectively to detect the detection patterns, the present invention only performs line-by-line traversal detection in a first direction. A further line-by-line traversal detection process after the central point of the first line segment is detected is not needed, and detection is performed based on the detected central point of the first line segment. Thus, detection steps may be greatly saved to simplify the detection procedure and improve computing speed. Thus, fast detection of detection patterns may be realized for a QR code image.

(2) In the method and system for detecting detection patterns of a QR code of this invention, the setting of the particular value of the detection step size takes account of not only different versions of QR code images, but also a minimum number of pixels contained in a single module according to each version, to ensure the reasonability and flexibility of the setting of the detection step size. Meanwhile, the detection is performed not only in the first and second directions, but also in diagonal directions, providing an assurance about not only fast detection of the detection patterns of the QR code image, but also the accuracy of the detection to a certain extent, with an effectively lowed rate of detection error.

(3) The method and system for detecting detection patterns of a QR code of this invention makes a fullest use of the characteristic of the detection patterns themselves, i.e., the black to white length ratio of a line segment passing through the detection pattern meets a ratio of 1:1:3:1:1. At the same time, in consideration of distortions or deformations that may cause a line segment passing through the central portion of a detection pattern to be unable to meet the ratio of 1:1:3:1:1 strictly, a predetermined ratio for detection is set, i.e., the detection condition of a detection pattern is considered to be satisfied if the length ratio of black:white:black:white:black meets the predetermined ratio. Setting a predetermined ratio may eliminate impacts caused by distortions or slight deformations to a certain extent while ensuring the accuracy of the detection.

BRIEF DESCRIPTION OF THE DRAWINGS

For a clear understanding of the content of this invention, this invention will be further described according to particular embodiments in reference to drawings.

FIG. 1 is a schematic diagram of an image detection method in the prior art;

FIG. 2 is a flowchart of a method for detecting detection patterns of a QR code according to this invention;

DESCRIPTION OF THE EMBODIMENTS

Embodiment 1

A method for detecting detection patterns of a QR code is provided in this embodiment, as shown in FIG. 2, comprising the following steps:

detecting the QR code along a first direction to detect a first line segment having a length ratio of black:white:black:white:black meeting a predetermined ratio, and determining the central point of the first line segment;

detecting along a second direction a straight line running through the central point of the first line segment to get a second line segment having a length ratio of black:white:black:white:black meeting the predetermined ratio, and using the central point of the second line segment as the central point of the detection pattern.

The core concept of this embodiment lies in that fast detection of detection patterns may be realized through making a use of the characteristic of the detection patterns themselves, i.e., each detection pattern may be considered as being composed of three superimposed concentric squares with 7×7 dark modules, 5×5 light modules, and 3×3 dark modules, respectively. Herein, a module is a basic information storage unit of a QR code image.

The QR code image of this embodiment is an image including a background and a QR code, which is obtained after a binarization process. Thus, dark and light modules in the detection patterns are represented in the form of black and white modules respectively. For each pixel in a module, it has a grayscale value of 0 or 255. During determining whether the line section ratio meets a predetermined ratio, whether pixels are black or white pixels are actually determined according to their grayscale values, and then whether the overall black to white ratio meets the predetermined ratio is determined.

Figure 3:
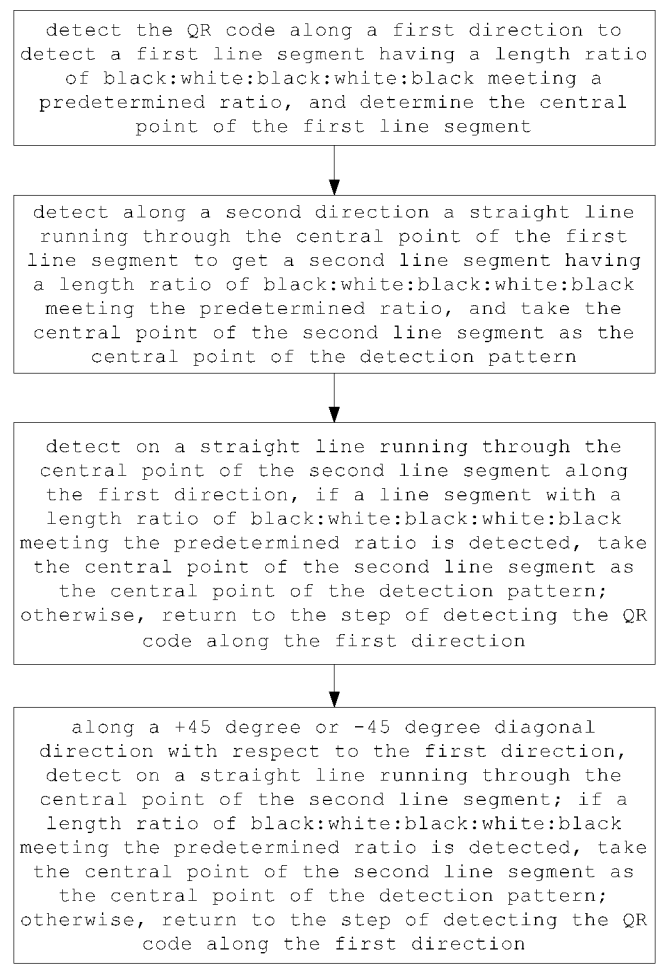
FIG. 3 is a flowchart of a method for detecting detection patterns of a QR code according to this invention.

The method for detecting detection patterns of a QR code in this embodiment, as shown in FIG. 3, further comprises the following step:

detecting on a straight line running through the central point of the second line segment along the first direction, if a line segment having a length ratio of black:white:black:white:black meeting the predetermined ratio is detected, taking the central point of the second line segment as the central point of the detection pattern; otherwise, returning to the step of detecting the QR code along the first direction.

The method may further comprise detecting on a straight line running through the central point of the second line segment along a +45 degree or −45 degree diagonal direction with respect to the first direction; if a line segment having a length ratio of black:white:black:white:black meeting the predetermined ratio is detected, taking the central point of the second line segment as the central point of the detection pattern; otherwise, returning to the step of detecting the QR code along the first direction. The above detection is provided to ensure the accuracy of the fast detection.

Figure 4:
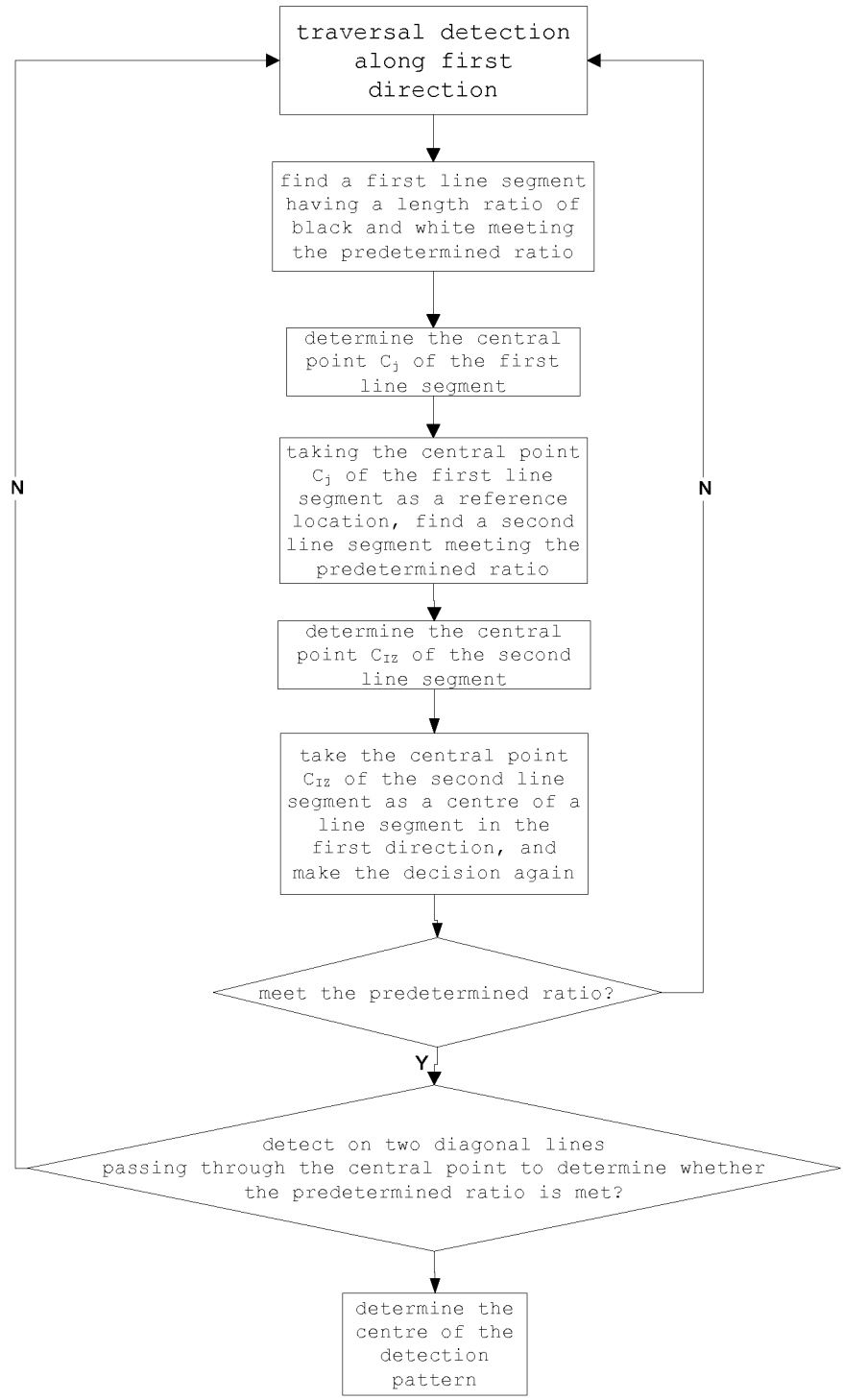
FIG. 4 is a flowchart of a method for detecting detection patterns of a QR code according to an embodiment.
Figure 5:
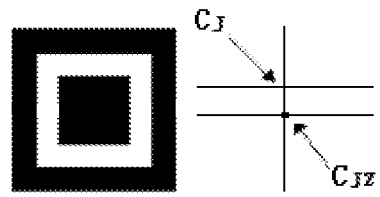
FIG. 5 is a schematic detection diagram of a method for detecting detection patterns of a QR code according to an embodiment.

Below, a further description will be given with reference to FIG. 4. FIG. 4 is a complete schematic flowchart. Herein, the first direction may be the horizontal direction or the vertical direction. In FIG. 4, at first, the QR code is detected along a first direction to detect a first line segment having a length ratio of black:white:black:white:black meeting a predetermined ratio. The central point of the first line segment $C_J$ is determined, which is obviously the central point of the detection pattern in the first direction, however, is not necessary the central point of the detection pattern in the second direction. As shown in FIG. 5, taking the central point $C_J$ of the first line segment obtained in the first direction detection as a reference, a straight line in a second direction is obtained. Whether there is a second line segment having a length ratio of black:white:black:white:black meeting the predetermined ratio is detected on the straight line. If a second line segment is detected, the central point $C_{JZ}$ of the second line segment is determined. Because the second line segment is obtained taking the central point of the detection pattern in the first direction as a reference, the second line segment must lie on a central line of the detection pattern in the first direction. Thus, in theory, the central point of the second line segment selected as such must be the centre of the detection pattern in the vertical direction and the geometric centre of the detection pattern.

In the above solution of this embodiment, the central point $C_{JZ}$ of the second line segment is determined as the central point of the detection pattern in theory, which is merely verified in the second direction, without confirming whether the condition of a length ratio of black:white:black:white:black meeting the predetermined ratio is satisfied in the first direction, so detection errors may occur. In order to prevent such situations, a determination is further made on a straight line that runs through the central point $C_{JZ}$ of the second line segment and along the first direction to determine whether there is a line segment having a length ratio of black:white:black:white:black meeting the predetermined ratio on the straight line. Meanwhile, diagonal direction detection is further provided to determine whether the condition of a length ratio of black:white:black:white:black meeting the predetermined ratio is satisfied on diagonal lines running through the central point $C_{JZ}$ of the detection pattern at ±45 degrees with respect to the first direction. If the central point of the second line segment is the central point of the detection pattern, the above condition must be satisfied; otherwise, it is not the central point of the detection pattern, which may further ensure the accuracy of the detection. Thereby, detection accuracy may be ensured to a certain extent, while ensuring the fast detection of the detection pattern, with an effectively lowered rate of detection errors.

A predetermined ratio is provided in this embodiment, which has a certain error compared with the ratio 1:1:3:1:1. The predetermined ratio in this embodiment is such configured that the ratio of the length of each black section to the total length of the black sections and the ratio of the length of each white section to the total length of the white sections are both within a range from 0.5:7 to 2:7. Due to the impacts of different imaging devices, the surrounding illumination, and environments, distortions and slight deformations may be generated on detection patterns of the QR code image. In this case, detection errors may occur and detection patterns cannot be detected successfully if the detection is performed according to whether the black to white length ratio may strictly meet the ratio of 1:1:3:1:1. In order to cope with such a situation, a predetermined ratio is provided in this embodiment. That is, when a line segment with five alternative black-white patterns not strictly meeting the ratio 1:1:3:1:1 is detected, the number of pixels in the complete line segment may be obtained and then the number of pixels in each black or white section in the line segment may be obtained to determine a ratio of the black or white section to the complete line segment, and the ratio condition of the detection pattern is considered as being satisfied if these ratios may meet the predetermined ratio. For example, if a pattern with five alternative black and white modules are detected on a line segment, and the total number of pixels is 210, wherein the number of pixels in the first black line section is 45, which has a ratio to the total pixels of 0.214. Because the predetermined ratio ranges from 0.5:7 to 2:7, i.e., from 0.071 to 0.286, the ratio of 0.214 falls within the predetermined ratio range. Thus, the ratio condition is considered as being met by the first black line section, and it is further determined whether each of other remaining line sections falls within the predetermined ratio range.

The method for detecting detection patterns of a QR code according to this embodiment makes a full use of the characteristic of the detection patterns themselves in the detection of detection patterns, i.e., the black to white length ratio of a line segment in the detection pattern meets a ratio of 1:1:3:1:1. In consideration of distortions or deformations that may cause a line segment passing through the central portion of a detection pattern to be unable to meet the ratio of 1:1:3:1:1 strictly, a predetermined ratio is set, i.e., the detection condition of a detection pattern is considered to be satisfied if the length ratio of black:white:black:white:black meets the predetermined ratio. Setting a predetermined ratio may eliminate impacts caused by distortions or slight deformations to a certain extent while ensuring the accuracy of the detection.

In the method for detecting detection patterns of a QR code of this invention, detection is performed, at first, in a first direction and then in a second direction based on the first direction detection, to detect a line segment having a length ratio of black:white:black:white:black meeting a predetermined ratio to determine the central points of the detection patterns, and thereby find out all detection patterns. Without line-by-line traversal detection in the entire QR code image in the vertical direction and the horizontal direction respectively, merely line-by-line traversal detection in a first direction is required to detect the detection patterns. Instead of a further line-by-line traversal detection process after the central point of the first line segment is detected, detection is performed based on the detected central point of the first line segment. Thus, detection steps may be greatly saved to simplify the detection procedure and improve computing speed. Thus, fast detection of detection patterns may be realized for a QR code image.

Embodiment 2

This embodiment comprises improvements made based on embodiment 1, which, in addition to steps described in embodiment 1, further comprises the following step:

setting a detection step size for detecting the QR code along the first direction, wherein the detection step size is less than or equal to the number of pixels contained in one module of the QR code in the first direction.

In the step of setting a detection step size for detecting the QR code along the first direction, the detection step size is obtained according to the number of pixels contained in the QR code in the first direction and the number of pixels contained in the one module in the first direction.

Further, in the step of setting a detection step size for detecting the QR code along the first direction, the detection step size is obtained through the following equation:

$$L = Max(M \times N/Mod, Min)$$

wherein, M is the number of pixels contained in the QR code in the first direction, N is an adjustment coefficient and $0 < N \leq 1$, Mod is a preset number of modules contained in the QR code in the first direction, Min is the number of pixels contained in one module of the QR code in the first direction.

M×N/Mod represents an average number of pixels in one module scaled at a ratio, which is compared with the number of pixels in one module in the first direction to select a larger one as the detection step size, and thus to reduce the number of lines that are scanned. M×N/Mod may be an average number of pixels in one module in the horizontal direction that is scaled at a ratio, or an average number of pixels in one module in the vertical direction. In order to ensure the overall accuracy of the detection, it is necessary to ensure a reasonable setting of a detection step size while reducing the number of lines that will be scanned as much as possible. Below, a particular description will be given in conjunction with different versions of QR code images.

As well known, there are 40 versions of QR code image: version 1, version 2 . . . version 40. Version 1 has 21×21 modules, Version 2 has 25×25 modules, and so on. Each version has 4 modules added on each side than a previous version, until version 40 which has 177×177 modules. Thus, the larger version number is, the more modules in the horizontal and vertical directions will be, and thus the more information contained therein, and the larger QR code image will be resulted. Before the detection patterns are detected successfully, the actual version of a QR code image cannot be recognized, in practice, only lower versions are commonly adopted, usually not higher than version 10. It is preferred to set a small detection step size to ensure the accuracy of the detection, i.e., the fewer modules contained in the QR code in the first direction, the better, and thus resulting in a minimal detection step size. However, on the basis of ensured detection accuracy, it is desired to speed up the detection. As a result, it is desired to set a detection step size as large as possible, in which case the more predetermined modules contained in the QR code in the first direction the better. Based on the two aspects above, preferably, the predetermined number of modules contained in a QR code in the first direction is Mod=57, corresponding to the version 10. The applicants process existing QR code images with the above setting, which may not only reduce computing steps but also ensure the accuracy of the detection, with a degree of accuracy of over 99%.

Because the number of modules contained in the horizontal/vertical direction corresponding to version 10 is 57, for QR code images of those versions lower than version 10, the detection step size is definitely smaller than the length of a module, which is however not true for versions higher than version 10. If the detection step size finally determined is larger than the length of a module, the central square of the detection pattern may be skipped during the detection, causing unsuccessful detection of the detection pattern. Taking this situation into consideration also, in order to prevent missing caused by an unreasonable detection step size setting, a corresponding value must be set to ensure that the detection step is not larger than the length of a module. After many times of numerical experiments, preferably, in the step of setting a detection step size for detecting the QR code along the first direction, the adjustment coefficient N is set to 0.75 in this embodiment.

In the method for detecting detection patterns of a QR code of this invention, the setting of the particular value of the detection step size takes account of not only different versions of QR code images, but also a minimum number of pixels contained in a single module of each version, to ensure the reasonability and flexibility of the setting of the detection step size.

Embodiment 3

Figure 6:
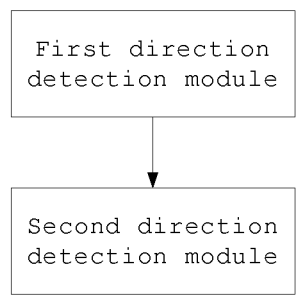
FIG. 6 is a structural diagram of a system for detecting detection patterns of a QR code according to this invention.

A system for detecting detection patterns of a QR code is provided in this embodiment, as shown in FIG. 6, comprising:

a first direction detection module, for detecting the QR code along a first direction to detect a first line segment having a length ratio of black:white:black:white:black meeting a predetermined ratio, and determining the central point of the first line segment;

a second direction detection module, for detecting along a second direction a straight line running through the central point of the first line segment to get a second line segment having a length ratio of black:white:black:white:black meeting the predetermined ratio, and using the central point of the second line segment as the central point of the detection pattern.

The core concept of this embodiment lies in that fast detection of detection patterns may be realized through making a use of the characteristic of the detection patterns themselves, i.e., each detection pattern may be considered as being composed of three superimposed concentric squares with 7×7 dark modules, 5×5 light modules, and 3×3 dark modules, respectively. Herein, a module is a basic information storage unit of a QR code image. The QR code image of this embodiment is an image including a background and a QR code, which is obtained after a binarization process. Thus, dark and light modules in the detection patterns are represented in the form of black and white modules respectively. For each pixel in a module, it has a grayscale value of 0 or 255. During determining whether the line section ratio meets a predetermined ratio, whether pixels are black or white pixels are actually determined according to their grayscale values, and then whether the overall black to white ratio meets the ratio of 1:1:3:1:1 is determined.

Figure 7:
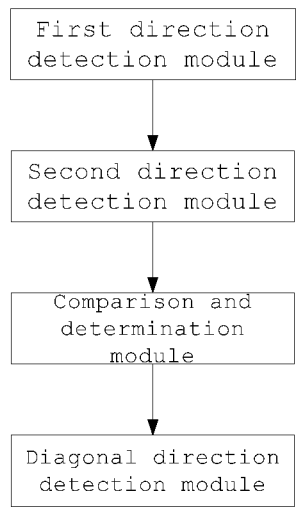
FIG. 7 is a structural diagram of a system for detecting detection patterns of a QR code according to an embodiment.

As shown in FIG. 7, the system for detecting detection patterns of a QR code in this embodiment further comprises:

a comparison and determination module, for detecting on a straight line running through the central point of the second line segment along the first direction, if a line segment having a length ratio of black:white:black:white:black meeting the predetermined ratio is detected, taking the central point of the second line segment as the central point of the detection pattern; otherwise, returning to the first direction detecting module.

a diagonal direction detection module, for along a +45 degree or −45 degree diagonal direction with respect to the first direction, detecting on a straight line running through the central point of the second line segment; if a line segment having a length ratio of black:white:black:white:black meeting the predetermined ratio is detected, taking the central point of the second line segment as the central point of the detection pattern; otherwise, returning to the first direction detection module.

The above detection is provided to ensure the accuracy of the fast detection. Below, a further description will be given with reference to FIG. 4. FIG. 4 is a complete schematic flowchart. Herein, the first direction may be the horizontal direction. However, as one skilled in the art may understand, the first direction may also be the vertical direction. In FIG. 4, at first, the QR code is detected along a first direction to detect a first line segment having a length ratio of black:white:black:white:black meeting a predetermined ratio. The central point of the first line segment $C_J$ is determined, which is obviously the central point of the detection pattern in the first direction, however, is not necessary the central point of the detection pattern in the second direction. As shown in FIG. 5, taking the central point $C_J$ of the first line segment obtained in the first direction detection as a reference, whether there is a second line segment having a length ratio of black:white:black:white:black meeting the predetermined ratio is detected in the second direction, such that the central point $C_{JZ}$ of a second line segment is determined. Because the second line segment is obtained taking the central point of the detection pattern in the first direction as a reference, the second line segment must lie on a central line of the detection pattern in the first direction. Thus, in theory, the central point of the second line segment selected as such must be the centre of the detection pattern in the vertical direction and the geometric centre of the detection pattern.

Figure 8:
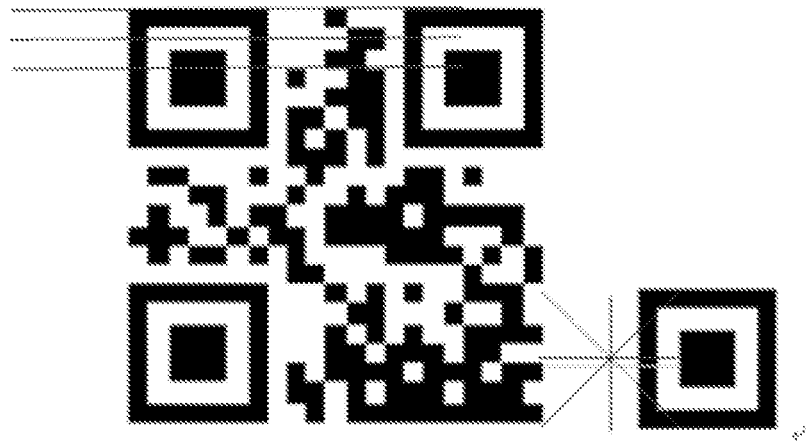
FIG. 8 is a schematic detection diagram of a system for detecting detection patterns of a QR code according to an embodiment.

The central point $C_{JZ}$ of the second line segment is determined as the central point of the detection pattern in theory, which is merely verified in the second direction, without confirming whether the condition of a length ratio of black:white:black:white:black meeting the predetermined ratio is satisfied in the first direction, so detection errors may occur. In order to prevent such situations, a determination is further made on a line segment that runs through the central point $C_{JZ}$ of the second line segment and along the first direction to determine whether the line segment has a length ratio of black:white:black:white:black meeting the predetermined ratio. Meanwhile, as shown in FIG. 8, diagonal direction detection is further provided to determine whether the condition of a length ratio of black:white:black:white:black meeting the predetermined ratio is satisfied on diagonal lines running through the central point $C_{JZ}$ of the detection pattern at ±45 degrees with respect to the first direction. If the central point of the second line segment is the central point of the detection pattern, the above condition must be satisfied; otherwise, it is not the central point of the detection pattern, which may further ensure the accuracy of the detection. Thereby, detection accuracy may be ensured to a certain extent, while ensuring the fast detection of the detection pattern, with an effectively lowered rate of detection errors.

A predetermined ratio is provided in this embodiment, which has a certain error compared with the ratio 1:1:3:1:1. The predetermined ratio in this embodiment is such configured that the ratio of the length of each black section to the total length of the black sections and the ratio of the length of each white section to the total length of the white sections are both within a range from 0.5:7 to 2:7.

Due to the impacts of different imaging devices, the surrounding illumination, and environments, distortions and slight deformations may be generated on detection patterns of the QR code image. In this case, detection errors may occur and detection patterns cannot be detected successfully if the detection is performed according to whether the black to white length ratio may strictly meet the ratio of 1:1:3:1:1. In order to cope with such a situation, a predetermined ratio is provided in this embodiment. That is, when a line segment with five alternative black-white patterns not strictly meeting the ratio 1:1:3:1:1 is detected, the number of pixels in the complete line segment may be obtained and then the number of pixels in each black or white section in the line segment may be obtained to determine a ratio of the black or white section to the complete line segment, and the ratio condition of the detection pattern is considered as being satisfied if these ratios may meet the predetermined ratio. For example, if a pattern with five alternative black and white modules are detected on a line segment, and the total number of pixels is 210, wherein the number of pixels in the first black line section is 45, which has a ratio to the total pixels of 0.214. Because the predetermined ratio ranges from 0.5:7 to 2:7, i.e., from 0.071 to 0.286, the ratio of 0.214 falls within the predetermined ratio range. Thus, the ratio condition is considered as being met by the first black line section, and it is further determined whether each of other remaining line sections falls within the predetermined ratio range.

The system for detecting detection patterns of a QR code in this embodiment makes a full use of the characteristic of the detection patterns themselves in the detection of detection patterns, i.e., the black to white length ratio of a line segment in the detection pattern meets a ratio of 1:1:3:1:1. In consideration of distortions or deformations that may cause a line segment passing through the central portion of a detection pattern to be unable to meet the ratio of 1:1:3:1:1 strictly, a predetermined ratio is set, i.e., the detection condition of a detection pattern is considered to be satisfied if the length ratio of black:white:black:white:black meets the predetermined ratio. Setting a predetermined ratio may eliminate impacts caused by distortions or slight deformations to a certain extent while ensuring the accuracy of the detection.

In the system for detecting detection patterns of a QR code of this invention, detection is performed, at first, in a first direction and then in a second direction based on the first direction detection, to detect a line segment having a length ratio of black:white:black:white:black meeting a predetermined ratio to determine the central points of the detection patterns, and thereby find out all detection patterns. Without line-by-line traversal detection in the entire QR code image in the vertical direction and the horizontal direction respectively, merely line-by-line traversal detection in a first direction is required to detect the detection patterns. Instead of a further line-by-line traversal detection process after the central point of the first line segment is detected, detection is performed based on the detected central point of the first line segment. Thus, detection steps may be greatly saved to simplify the detection procedure and improve computing speed. Thus, fast detection of detection patterns may be realized for a QR code image.

Embodiment 4

This embodiment comprises improvements made based on embodiment 3, which in addition to components described in embodiment 3, further comprises:

a detection step size setting module, for setting a detection step size for detecting the QR code along the first direction, wherein the detection step size is less than or equal to the number of pixels contained in one module of the QR code in the first direction.

The detection step size setting module is configured to obtained the detection step size according to the number of pixels contained in the QR code in the first direction and the number of pixels contained in the one module in the first direction.

The detection step size setting module obtains the detection step size through the following equation:

$$L=Max(M \times N/Mod, Min)$$

wherein, M is the number of pixels contained in the QR code in the first direction, N is an adjustment coefficient and $0<N\leq 1$, Mod is a preset number of modules contained in the QR code in the first direction, Min is the number of pixels contained in one module of the QR code in the first direction.

M×N/Mod represents an average number of pixels in one module scaled at a ratio, which is compared with the minimal number Min of pixels in one module to select a larger one as the detection step size, and thus to reduce the number of lines that are scanned. M×N/Mod may be an average number of pixels in one module in the horizontal direction that is scaled at a ratio, or an average number of pixels in one module in the vertical direction. In order to ensure the overall accuracy of the detection, it is necessary to ensure a reasonable setting of a detection step size while reducing the number of lines that will be scanned as much as possible. Below, a particular description will be given in conjunction with different versions of QR code images.

Figure 9:
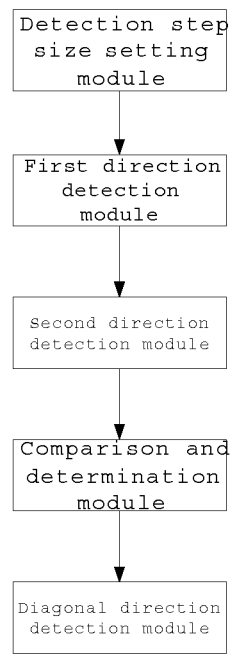
FIG. 9 is a structural diagram of a system for detecting detection patterns of a QR code according to an embodiment.
Figure 10:
FIG. 10 is a detection effect diagram of detection patterns of a QR code according to this invention.

As well known, there are 40 versions of QR code image: version 1, version 2 . . . version 40. Version 1 has 21×21 modules, Version 2 has 25×25 modules, and so on. Each version has 4 modules added on each side than a previous version, until version 40 which has 177×177 modules. Thus, the larger version number is, the more modules in the horizontal and vertical directions will be, and thus the more information contained therein, and the larger QR code image will be resulted. Before the detection patterns are detected successfully, the actual version of a QR code image cannot be recognized, in practice, only lower versions are commonly adopted, usually not higher than version 10. It is preferred to set a small detection step size to ensure the accuracy of the detection, i.e., the fewer modules contained in the QR code in the first direction, the better, and thus resulting in a minimal detection step size. However, on the basis of ensured detection accuracy, it is desired to speed up the detection. As a result, it is desired to set a step as large as possible, in which case the more modules contained in the QR code in the first direction the better. Based on the two aspects above, preferably, the predetermined number of modules contained in a QR code in the first direction is Mod=57, corresponding to the version 10. As shown in FIG. 9, an effect diagram of detection patterns obtained through fast detection on the premise of version 1. QR code images that are commonly used in practice are generally those in lower versions, in general, not higher than version 10. The selection of version 10 is substantially appropriate for the detection of detection patterns for most QR code images used in our daily life. The applicants process existing QR code images with the above setting, which may not only reduce computing steps but also ensure the accuracy of the detection, with a degree of accuracy of over 99%. Those skilled in the art may make a reasonable selection of the version number i according to requirements for the amount of computation and accuracy.

Because the number of modules contained in the horizontal/vertical direction corresponding to version 10 is 57, for QR code images of those versions lower than version 10, the detection step size is definitely smaller than the length of a module, which is however not true for versions higher than version 10. If the detection step size finally determined is larger than the length of a module, the central square of the detection pattern may be skipped during the detection, causing unsuccessful detection of the detection pattern. Taking this situation into consideration also, in order to prevent missing caused by an unreasonable detection step size setting, a corresponding value must be set to ensure that the detection step is not larger than the length of a module. After many times of numerical experiments, preferably, the adjustment coefficient N is set to 0.75 in this embodiment.

In the system for detecting detection patterns of a QR code of this embodiment, the setting of the particular value of the detection step size takes account of not only different versions of QR code images, but also a minimum number of pixels contained in a single module of each version, to ensure the reasonability and flexibility of the setting of the detection step size.

A person skilled in the art should appreciate that the examples of the present application may be provided as method, system, or a computer program product. Therefore, the present application may take the form of completely hardware examples, completely software examples, or hardware and software combined examples. Moreover, the present application may adopt the form of a computer program product implemented on one or more computer readable storage medium (including but not limited to a disk storage, a CD-ROM, an optical disk, etc) containing computer usable program codes.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Figure 11:
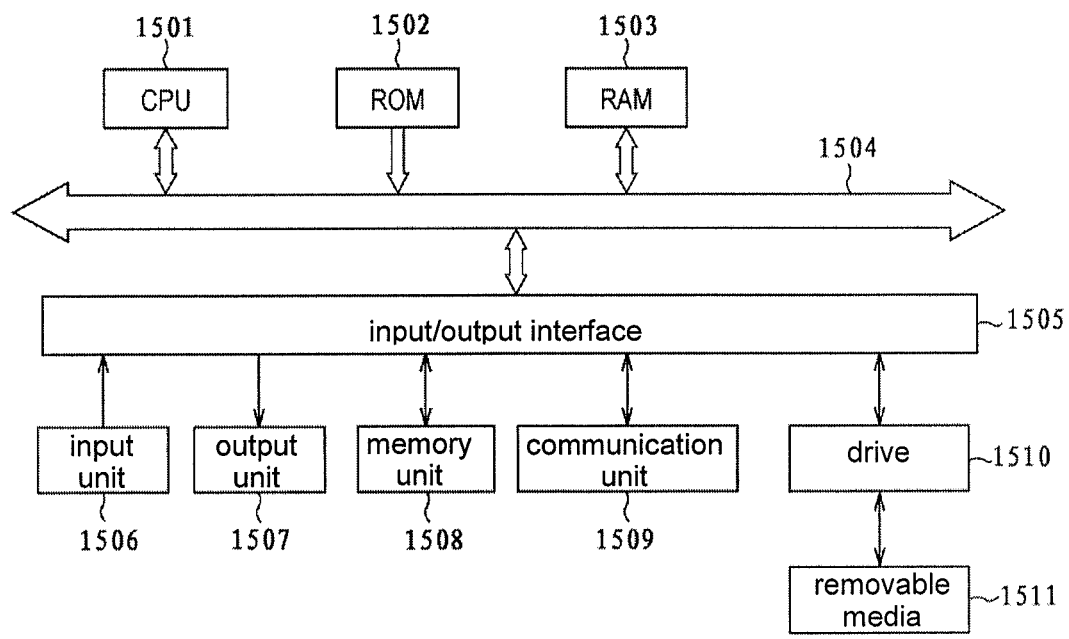
FIG. 11 shows a block diagram of an example of the structure of a computer.

FIG. 11 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for detecting detection patterns of a QR code, comprising:
    detecting the QR code along a first direction to detect a first line segment having a length ratio of black:white:black:white:black meeting a predetermined ratio, and determining the central point of the first line segment;
    detecting along a second direction a straight line running through the central point of the first line segment to get a second line segment having a length ratio of black:white:black:white:black meeting the predetermined ratio, and using the central point of the second line segment as the central point of the detection pattern.

2. The method for detecting detection patterns of a QR code according to claim 1 further comprising:
    detecting on a straight line running through the central point of the second line segment along the first direction, if a line segment having a length ratio of black:white:black:white:black meeting the predetermined ratio is detected, taking the central point of the second line segment as the central point of the detection pattern; otherwise, returning to the step of detecting the QR code along the first direction.

3. The method of claim 1 further comprising:
    along a +45 degree or −45 degree diagonal direction with respect to the first direction, detecting on a straight line running through the central point of the second line segment; if a line segment having a length ratio of black:white:black:white:black meeting the predetermined ratio is detected, taking the central point of the second line segment as the central point of the detection pattern; otherwise, returning to the step of detecting the QR code along the first direction.

4. The method of claim 1 wherein the predetermined ratio is such configured that the ratio of the length of each black section to the total length of the black and white sections and the ratio of the length of each white section to the total length of the black and white sections are both within a range from 0.5:7 to 2:7.

5. The method of claim 1 further comprising:
    setting a detection step size for detecting the QR code along the first direction, wherein the detection step size is less than or equal to the number of pixels contained in one module of the QR code in the first direction.

6. The method of claim 5 wherein in the step of setting a detection step size for detecting the QR code along the first direction, the detection step size is obtained according to the number of pixels contained in the QR code in the first direction and the number of pixels contained in the one module in the first direction.

7. The method of claim 5 wherein in the step of setting a detection step size for detecting the QR code along the first direction, the detection step size is obtained through the following equation:

$$L = \mathrm{Max}(M \times N / \mathrm{Mod}, \mathrm{Min})$$

wherein, M is the number of pixels contained in the QR code in the first direction, N is an adjustment coefficient and 0<N≤1, Mod is a predetermined number of modules contained in the QR code in the first direction, Min is the number of pixels contained in one module of the QR code in the first direction.

8. The method of claim 7 wherein in the step of setting a detection step size for detecting the QR code along the first direction, the predetermined number of modules contained in the QR code in the first direction is Mod=57.

9. The method of claim 7 wherein in the step of setting a detection step size for detecting the QR code along the first direction, the adjustment coefficient N is set to 0.75.

10. A system for detecting detection patterns of a QR code, the system comprising:
a first direction detection module, for detecting the QR code along a first direction to detect a first line segment having a length ratio of black:white:black:white:black meeting a predetermined ratio, and determining the central point of the first line segment;
a second direction detection module, for detecting along a second direction a straight line running through the central point of the first line segment to get a second line segment having a length ratio of black:white:black:white:black meeting the predetermined ratio, and using the central point of the second line segment as the central point of the detection pattern.

11. The system of claim 10 further comprising:
a comparison and determination module, for detecting on a straight line running through the central point of the second line segment along the first direction, if a line segment having a length ratio of black:white:black:white:black meeting the predetermined ratio is detected, taking the central point of the second line segment as the central point of the detection pattern; otherwise, returning to the first direction detecting module.

12. The system of claim 10 further comprising:
a diagonal direction detection module, for along a +45 degree or −45 degree diagonal direction with respect to the first direction, detecting on a straight line running through the central point of the second line segment; if a line segment having a length ratio of black:white:black:white:black meeting the predetermined ratio is detected, taking the central point of the second line segment as the central point of the detection pattern; otherwise, returning to the first direction detection module.

13. The system of claim 10 wherein the predetermined ratio is such configured that the ratio of the length of each black section to the total length of the black and white sections and the ratio of the length of each white section to the total length of the black and white sections are both within a range from 0.5:7 to 2:7.

14. The system of claim 10 further comprising:
a detection step size setting module, for setting a detection step size for detecting the QR code along the first direction, wherein the detection step size is less than or equal to the number of pixels contained in one module of the QR code in the first direction.

15. The system of claim 14 wherein the detection step size setting module is configured to obtained the detection step size according to the number of pixels contained in the QR code in the first direction and the number of pixels contained in the one module in the first direction.

16. The system of claim 14 wherein the detection step size setting module obtains the detection step size through the following equation:

$$L=\text{Max}(M\times N/\text{Mod}, \text{Min})$$

wherein, M is the number of pixels contained in the QR code in the first direction, N is an adjustment coefficient and 0<N≤1, Mod is a predetermined number of modules contained in the QR code in the first direction, Min is the number of pixels contained in one module of the QR code in the first direction.

17. The system of claim 16, wherein the detection step size setting module sets the predetermined number of modules contained in the QR code in the first direction to Mod=57.

18. The system of claim 16 wherein the detection step size setting module sets the adjustment coefficient N to 0.75.

19. A system for detecting detection patterns of a QR code, the system comprising a processor, wherein the processor is configured to
detect the QR code along a first direction to detect a first line segment having a length ratio of black:white:black:white:black meeting a predetermined ratio, and determine the central point of the first line segment;
detect along a second direction a straight line running through the central point of the first line segment to get a second line segment having a length ratio of black:white:black:white:black meeting the predetermined ratio, and use the central point of the second line segment as the central point of the detection pattern.

* * * * *